(12) United States Patent
Kaehler

(10) Patent No.: US 8,120,754 B2
(45) Date of Patent: Feb. 21, 2012

(54) LIGHT DETECTION AND RANGING APPARATUS

(75) Inventor: Adrian Kaehler, North Hollywood, CA (US)

(73) Assignee: Northrop Grumman Systems Corporation, Los Angeles, CA (US)

(*) Notice: Subject to any disclaimer, the term of this patent is extended or adjusted under 35 U.S.C. 154(b) by 328 days.

(21) Appl. No.: 12/389,065

(22) Filed: Feb. 19, 2009

(65) Prior Publication Data

US 2010/0208235 A1    Aug. 19, 2010

(51) Int. Cl.
    *G01C 3/08* (2006.01)
(52) U.S. Cl. ............ 356/5.01; 356/3.01; 356/4.01; 356/5.1; 356/5.15
(58) Field of Classification Search ........ 356/3.01–3.15, 356/4.01–4.1, 5.01–5.15, 6–22, 28, 28.5
    See application file for complete search history.

(56) References Cited

U.S. PATENT DOCUMENTS

| 6,022,115 A | 2/2000 | Borra et al. |
| 6,147,747 A * | 11/2000 | Kavaya et al. ............ 356/4.01 |

FOREIGN PATENT DOCUMENTS

| EP | 0 473 866 A2 | 3/1992 |
| EP | 0473866 | * 3/1992 |
| EP | 2 113 790 A1 | 11/2009 |
| JP | 01 161107 A | 6/1989 |

OTHER PUBLICATIONS

European Search Report for corresponding EP 10 15 3957, completed May 10, 2010 in Munich.

* cited by examiner

*Primary Examiner* — Thomas Tarcza
*Assistant Examiner* — Luke Ratcliffe
(74) *Attorney, Agent, or Firm* — Tarolli, Sundheim, Covell & Tummino LLP

(57) ABSTRACT

A light detection and ranging (LIDAR) apparatus is provided that employs one or more additional reflectors to reflect and redirect the light beam transmission pulses from a scanning fan assembly to a given area of interest. The one or more additional reflectors provide additional resolution for detecting a detectable object. The one or more additional reflectors can be external or internal to the scanning fan assembly.

15 Claims, 3 Drawing Sheets

LIGHT DETECTION AND RANGING APPARATUS

TECHNICAL FIELD

The present invention relates generally to computer software, and more particularly to light detection and ranging systems.

BACKGROUND

Lidar (light detection and ranging) uses laser technology to make precise distance measurements over long or short distances. LIDAR units have found widespread application in both industry and the research community. The majority of "off-the-shelf" LIDAR units emit beams of light in rapid succession, scanning across the angular range of the unit (i.e. the "field of view") in a fan-like pattern. Many LIDAR units reflect a pulsed beam of laser light from a rotating mirror to scan across the angular range of the unit (i.e., the "field of view") in a fan-like pattern. Using a time of flight calculation applied to any reflections received, the LIDAR unit obtains range measurements, r, along the singular angular dimension, t, of the scanning fan. LIDAR units typically create the scanning fan by reflecting a pulsed source of laser light from a rotating mirror. The mirror also reflects any incoming reflections to the receiving optics. While the mirror does rotate through a complete revolution, the housing of the LIDAR unit limits the angular range to below 360 degrees. Some modern LIDAR units have reduced the angular extent of the housing to offer relatively large angular ranges, from 180 (SICK) to 270 (Hokuyo) degrees.

In many LIDAR units, the individual beams within the scanning fan are also divergent. That is, the cross section of the beam expands as it radiates outward from the LIDAR unit. Often, the divergence of the individual beams in the plane of the scanning fan matches (approximately) the angular pitch of the beams within the scanning fan, ensuring that no gaps emerge within the scanning fan as it radiates outward from the unit. The beams may also diverge out of the plane of scanning fan, allowing range information to be acquired for targets above or below the plane of the scanning fan. The divergence of the beams out of the scanning fan plane often does not match the divergence within the scanning fan plane. That is, the cross section of the individual beams is often elliptical.

While the large angular range of typical LIDAR units does allow the acquisition of range data over a wide range of space, the spatial resolution of the measurements (especially at large distances) is accordingly reduced. Even in LIDAR units with scanning fans containing a thousand beams, the spacing of the measurements can be significant at large distances. Existing LIDAR units are therefore ill suited for applications in which a relatively dense set of range measurements is desired but physical or practical restrictions prohibit close-in access to the target.

SUMMARY

In one aspect of the invention, a light detection and ranging (LIDAR) apparatus is provided. The LIDAR apparatus comprises a light source that provides light beam transmission pulses and a scanning fan assembly that directs light beam transmission pulses at each of a given emittance angle over a given angular range. The LIDAR apparatus further comprises a detection system that detects light beam return pulses associated with respective light beam transmission pulses and determines a distance of a detectable object associated with the given emittance angle for each emittance angle over the given angular range and at least one additional reflector positioned to reflect and redirect the light beam transmission pulses from the scanning fan assembly to a given area of interest.

In another aspect of the invention, a LIDAR apparatus is provided. The LIDAR apparatus comprises means for providing light beam transmission pulses, means for directing light beam transmission pulses at each of a given emittance angle over a given angular range and means for detecting light beam return pulses associated with a respective transmission light beam transmission pulse. The LIDAR apparatus further comprises means for determining a distance of a detectable object associated with the given emittance angle for each emittance angle over the given angular range and means for reflecting and redirecting the light beam transmission pulses from the means for directing light beam transmission pulses to a given area of interest.

DETAILED DESCRIPTION

The present invention relates to a LIDAR apparatus that employs one or more additional reflectors to reflect and redirect the light beam transmission pulses from a scanning fan assembly to a given area of interest. The one or more additional reflectors provide additional resolution for detecting a detectable object. The one or more additional reflectors can be external or internal to the scanning fan assembly.

Figure 1:
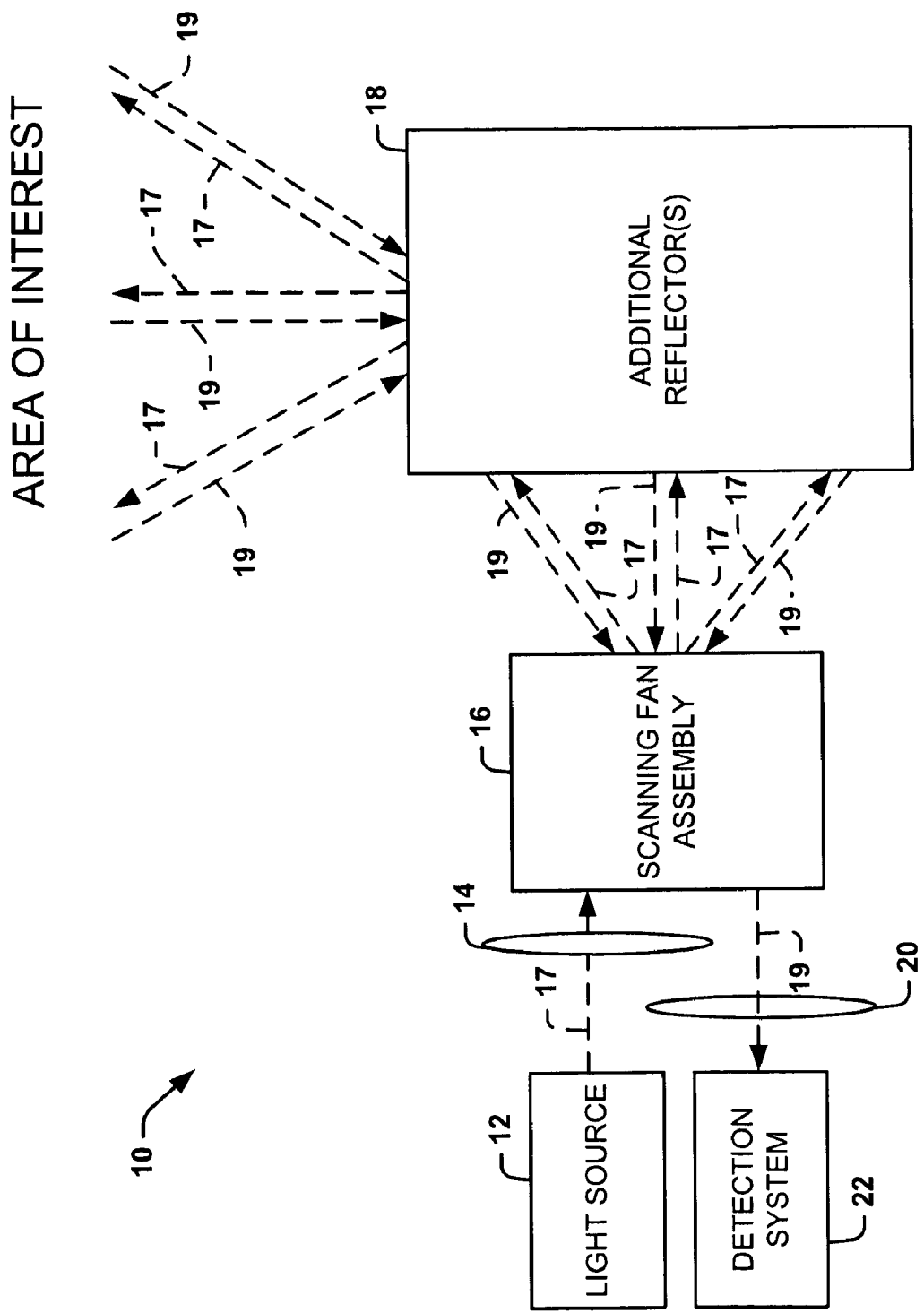
FIG. 1 illustrates a LIDAR apparatus in accordance with an aspect of the present invention.

FIG. 1 illustrates a LIDAR apparatus 10 in accordance with an aspect of the present invention. The LIDAR apparatus 10 includes a light source 12 (e.g., laser, light emitting diode (LED)) that provides light beam transmission pulses 17 through one or more lenses 14 to a scanning fan assembly 16. The scanning fan assembly 16 directs the light beam transmission pulses 17 at each of a given emittance angle over a given angular range. The scanning fan assembly 16 can include a rotating mirror driven by a mirror motor coupled to the mirror via a mirror rotation assembly. The scanning fan assembly 16 provides a scanning fan of light beam transmission pulses 17 over the given angular range. One or more additional reflectors 18 of the apparatus are positioned to reflect and redirect the light beam transmission pulses 17 from the scanning fan assembly 16 to a given area of interest. Light beam return pulses 19 each associated with a given respective light beam transmission pulse reflects off one or more detectable objects within the area of interest through the one or more additional reflectors 18 to the scanning fan assembly 16 and are focused on a detection system 22 through one or more lenses 20. The detection system 22 detects light beam return pulses 19 associated with each respective light beam transmission pulse 17 and determines a distance associated with the given emittance angle for each emittance angle over the given angular range. The detection system 22 can include a light detector and hardware and/or software for calculating and storing polar range data for each emittance angle over the given angular range. The polar range data can be employed to determine a location and/or shape of the one or more detectable objects within the area of interest.

Figure 2:
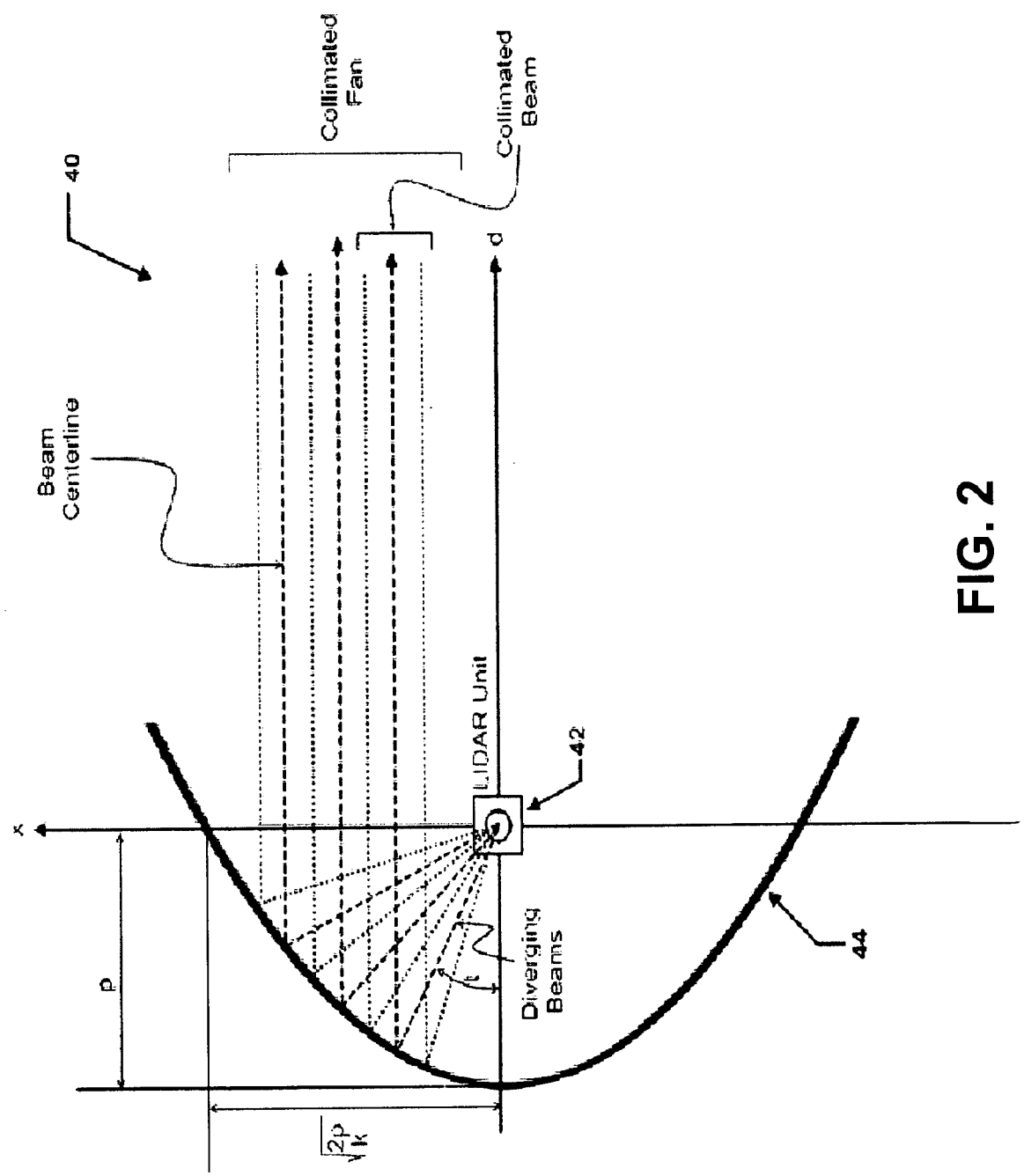
FIG. 2 illustrates a LIDAR apparatus that employs an additional external reflector to redirect light beam transmission pulses to a given area of interest in accordance with an aspect of the present invention.

FIG. 2 illustrates a LIDAR apparatus 40 that employs an additional external reflector to redirect light beam transmission pulses to a given area of interest in accordance with an aspect of the present invention. A LIDAR unit 42 is positioned at the focus of a parabolic reflector 44 and oriented such that a scanning fan of light beam transmission pulses from the scanning fan assembly of the LIDAR unit 42 emanates into the reflector 44 and the centerline of the angular range is coincident with the parabola axis of the reflector 44. The parabolic reflector 44 is physically coupled to the LIDAR unit 42 via arms, columns or the like (not shown) and thus collimates the scanning fan, with the centerlines of the beams within the scanning fan emerging from the parabolic reflector 44 parallel to one another. As shown in FIG. 2, the parabolic reflector 44 also collimates the individual light beam transmission pulses within the scanning fan. For LIDAR units with a beam divergence matching the angular pitch of the scanning fan, the scanning fan is reflected in a "gap-free" manner. In collimating the scanning fan, the LIDAR apparatus 40 facilitates range measurements at high resolution despite large distances between the LIDAR apparatus 40 and detected object. In collimating the individual beams within the scanning fan, the LIDAR apparatus 40 ensures complete illumination of the measured region.

The parabolic reflector 44 may be either two- or three-dimensional. A three-dimensional reflector (i.e. a paraboloid) may be used for LIDAR units with significant beam divergence out of the scanning fan plane. For LIDAR units in which the divergence of the individual beams out of the scanning fan plane is not considered significant, a two-dimensional parabolic reflector may be sufficient. In either case, the width of the reflector 44 out of the scanning fan plane can be minimized, as it need only accommodate the beam divergence out of the scanning fan plane over the distance between the LIDAR unit 42 and the reflector 44. The resulting strip-like reflector allows for a more compact packaging arrangement.

It is to be appreciated that the amount of beam divergence varies among LIDAR unit designs. In particular, some LIDAR units exhibit a minimal divergence. If complete, gap-free coverage of the measured region is desired, the LIDAR apparatus 40 may be fitted with additional optics to provide the required divergence. Similarly, some application may require a minimal beam width out of the scanning fan plane. In this case, the LIDAR unit 42 may be fitted with additional collimating optics nearer the laser light source. As noted above, minimizing the beam divergence out of the scanning fan plane also allows the use of a two-dimensional parabolic reflector. In each case, though, it is desirable to keep the center of divergence of the scanning fan and the center of divergence of the individual beams substantially coincident with each other and the focus of the parabolic reflector 44.

The LIDAR unit 42 shown in FIG. 2 has an angular range of approximately 180 degrees, and the parabolic reflector 44 is truncated along the latus rectum of the parabola. If a LIDAR unit with smaller angular range is used, the size of the parabolic reflector 44 may be reduced by further truncation. Correspondingly, if a LIDAR unit with a larger angular range is used, the parabolic reflector 44 can be extended so that the LIDAR unit 42 is more deeply "nested" within the reflector 44. It is not strictly necessary, however, that the entire scanning fan be incident upon the reflector. That is, a portion of the angular range may be "discarded" if extension of the reflector 44 is impractical.

Operation of the LIDAR apparatus 40 can include conversion of the angular range data acquired by the unmodified LIDAR unit 42 $(r,t)$ to linear range data $(d,x)$, where d represents the distance from the latus rectum, and x is a linear coordinate along the latus rectum with origin at the LIDAR unit 42. The conversion is based entirely on the fixed geometry of the apparatus. Describing the parabolic reflector by the equation $y=\frac{1}{2} k x^2 - p$), where p is the distance between the vertex and focus of the parabolic reflector 44. For the apparatus 40 shown in FIG. 2 (characterized by a LIDAR unit with an angular range of 180 degrees), $d = r - q (1-\sin(t))$, where q is given by the quadratic equation $k^2 \cos(t)^2 q^2 + \sin(t) q - p = 0$. The relationship between the angular coordinate t and the linear coordinate x is given by the quadratic equation: $k x^2 + 4 p \tan(t) x - 4 p^2 = 0$.

The LIDAR apparatus 40 can acquire range measurements over x values between $-x_0$ and $+x_0$, where $x_0$ is defined to be the square root of $2 p/k$. That is, the horizontal distance over which range measurements can be acquired (i.e. the horizontal field of view of the system) is $4 p$, the length of the latus rectum. Thus, the horizontal field of view of the apparatus 40 can be selected as desired through appropriate choice of the parabolic reflector 44. Larger values of p yield a "broader" reflector and a larger horizontal field of view but reduce spatial resolution. It should be appreciated that range measurements near $x=0$ will be obscured by the LIDAR unit 42 itself. This effect may motivate the use of broader reflectors and LIDAR units with small housings. Alternatively, the LIDAR fan may be oriented out of the plane of the parabola. This resulting measurement points will fall along a curve rather than a line, but this may be acceptable in some applications.

In one aspect of the invention, the LIDAR unit 42 and parabolic reflector 44 are rigidly connected and can be rotated through an angular dimension orthogonal to that of the scanning fan plane. This would allow the acquisition of three dimensional range data $(d, x, a)$. Although, the LIDAR apparatus 40 is illustrated based on a scanning LIDAR unit 42 incorporating a rotating mirror, the invention may also be constructed from scanning LIDAR units incorporating electro- or acousto-optical beam direction.

Despite efforts of LIDAR unit manufacturers to limit the angular extent of LIDAR unit housings, a fraction (e.g. one half, one quarter) of the beams reflected by the rotating mirror of a LIDAR unit remains incident upon the interior of the housing. These beams are essentially "wasted" in that they do not provide meaningful range data. Additionally, in those applications where the angular extent (or anticipated angular range of motion) of a detectable object is relatively small compared to the angular range of the LIDAR unit, the majority of the beams within the scanning fan will not intersect the detectable object. These beams are also wasted.

Therefore, in another aspect of the present invention, one or more fixed internal mirrors are mounted within the LIDAR housing in close proximity to the rotating mirror of a LIDAR unit to "harvest" the emitted beams that would otherwise not intersect the detectable object. The internal mirrors redirect the harvested beams to within the area of interest, increasing the data rate and angular resolution at which a single LIDAR unit can acquire range data. The increased data rate and resolution enhance the ability of the LIDAR unit to determine the geometry and track the location of one or more stationary or moving targets. The internal mirrors redirect the harvested beams to within an area of interest (i.e. the angular extent of the detectable object or the expected range of motion of the detectable object), creating one or more "virtual" rangefinders that supplement the "physical" rangefinder (i.e., rotating mirror). Collectively, the virtual and physical rangefinders increase the number of beams incident upon a detectable object within the area of interest, increasing the data rate and angular resolution of the LIDAR unit.

Figure 3:
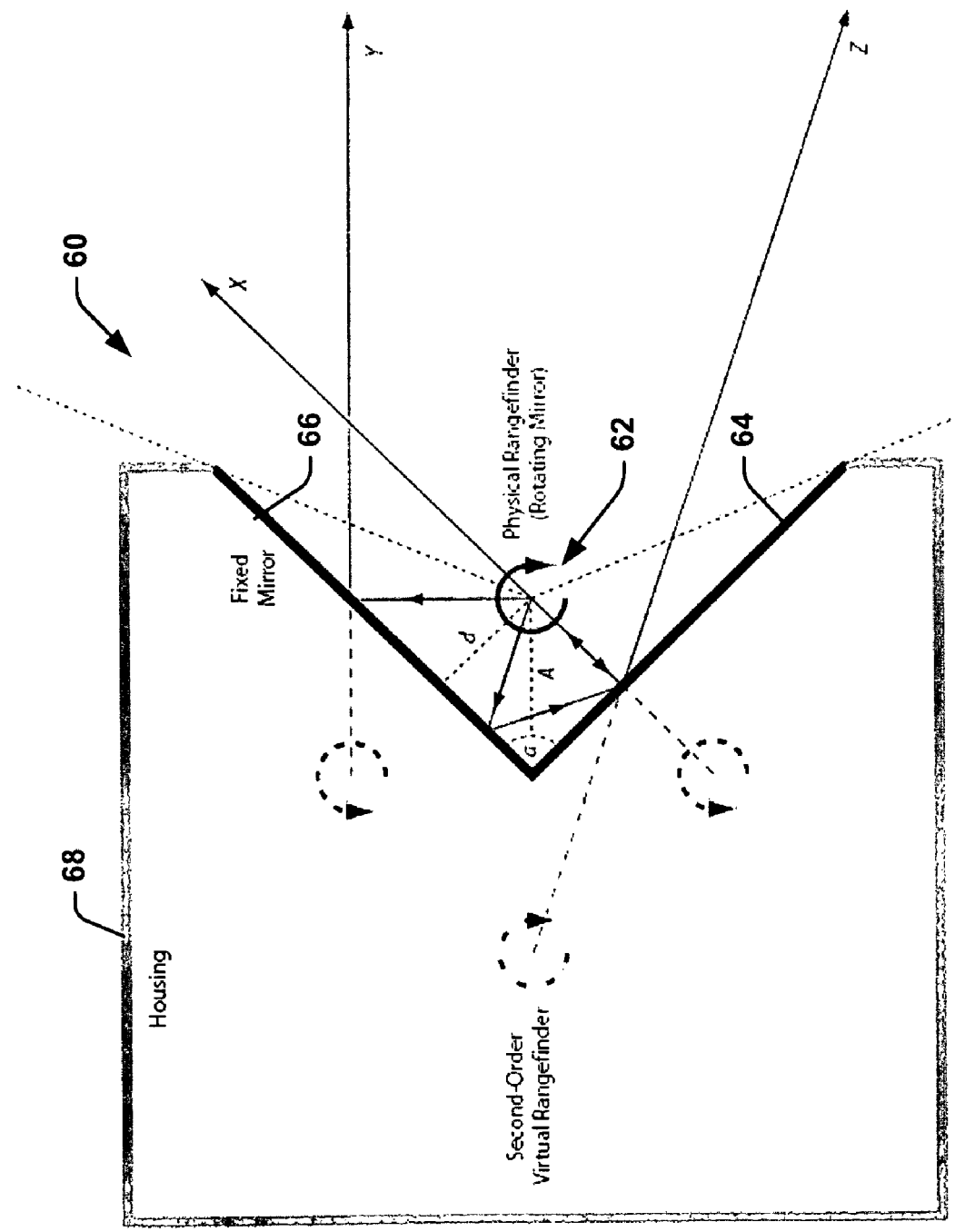
FIG. 3 illustrates a LIDAR apparatus that employs additional internal reflectors to redirect light beam transmission pulses to a given area of interest in accordance with an aspect of the present invention.

FIG. 3 illustrates a LIDAR apparatus 60 that employs additional internal reflectors to redirect light beam transmission pulses to a given area of interest in accordance with an aspect of the present invention. As illustrated in FIG. 3, a physical rangefinder 62 (e.g., a rotating mirror of a scanning fan assembly) is recessed within an angle, a, formed by two fixed mirrors 64 and 66 affixed to a recess within a housing 68 of the LIDAR apparatus 60. The fixed mirrors 64 and 66 are perpendicular to the scanning plane of the rotating mirror. The physical range finder 62 emits beams in all directions. Some of the beams (such as beam X) emerge from the housing 68 without incidence upon one of the fixed mirrors 64 and 66. Other beams (such as beams Y and Z) will emerge from the housing 68 only after reflecting from one or both of the fixed mirrors 64 and 66. Those beams that reflect from one of the fixed mirrors 64 and 66 are associated with a virtual rangefinder. The location of the virtual rangefinders is symmetric to the position of the physical rangefinder 62 about the plane of the reflecting fixed mirror 64 and/or 66 and along the line normal to the fixed mirror 64 and/or 66 and passing through the physical rangefinder 62.

If a beam reflecting from a first fixed mirror reflects from a second fixed mirror (such as beam Z), a "second-order" virtual rangefinder is created, located at a position symmetric to the "first-order" virtual rangefinder about the second fixed mirror. In the particular configuration shown in FIG. 3 (in which a=90 degrees), the two second-order virtual rangefinders associated with the two fixed mirrors 64 and 66, respectively, align and collapse into a single second-order virtual rangefinder. The virtual rangefinders operate synchronously with the physical rangefinder 62. The direction (i.e. angular rotation) of the scanning, though, reverses upon reflection. As with the physical rangefinder 62, ranges are computed based on a time-of-flight calculation.

The fixed mirrors 64 and 66 ensure that all beams emitted from the rotating mirror emerge from the housing and no beams are wasted due to incidence upon a non-reflective interior of the housing 68. Moreover, the mirrors 64 and 66 narrow the range across which the beams emerge from the housing 68, with the specific angular range determined by the position of the physical rangefinder 62 relative to the distal ends of the fixed mirrors 64 and 66. Consequently, compared to a conventional LIDAR unit, more beams are emitted in a narrower angular range, increasing the rate at which beams are incident upon a detectable object. The result is an increased data rate and an improved angular resolution.

While the exemplary configuration shown in FIG. 3 is particularly simple and effective, other configurations are also possible. Any number of mirrors may be used to create any number of virtual rangefinders, with the general constraint that the physical rangefinder 62 be recessed within a concave configuration of fixed mirrors. Additionally, the apparatus 60 may allow the user to adjust the extent to which the physical rangefinder 62 is recessed within the mirrors 64 and 66 and therefore the effective angular range of the apparatus 60. For example, for the configuration illustrated in FIG. 3, the position of the physical rangefinder 62 may be adjusted along line A to adjust the angular range of the apparatus 60 between the angular separation of the mirrors, a, and 180 degrees.

As shown in FIG. 3, the separation of the virtual rangefinders is characterized by a typical distance, d, between the physical rangefinder 62 and the fixed mirrors 64 and 66. It is anticipated that most detectable objects of interest will be located at a distance L>>d. The variation in "viewing angle" offered by the virtual rangefinders (compared to the physical rangefinder) is therefore minimal. However, for comparatively close range targets, where L~d, the variation in viewing angle may be significant. Although FIG. 3 is based on a scanning LIDAR unit incorporating a rotating mirror, the invention may also be constructed from scanning LIDAR units incorporating electro- or acousto-optical beam direction.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

Having described the invention, the following is claimed:

1. A light detection and ranging (LIDAR) apparatus comprising:

a light source that provides light beam transmission pulses;

a scanning fan assembly that directs light beam transmission pulses at each of a given emittance angle over a given angular range;

a detection system that detects light beam return pulses associated with respective light beam transmission pulses and determines a distance of a detectable object associated with the given emittance angle for each emittance angle over the given angular range; and at least one additional reflector positioned to reflect and redirect the light beam transmission pulses from the scanning fan assembly to a given area of interest;

wherein the scanning fan assembly and the at least one reflector reside in a housing of the apparatus, the at least one reflector being at least one fixed internal mirror mounted within the housing in close proximity to a rotating mirror of the scanning fan assembly and being configured to harvest and redirect light beam transmission pulses to the area of interest external to the housing from the rotating mirror that would otherwise not exit the housing of the LIDAR apparatus;

wherein the at least one fixed internal mirror comprises two fixed internal mirrors recessed within an angle within the housing of the LIDAR apparatus, the two fixed internal mirrors being perpendicular to the scanning plane of the rotating mirror to redirect the harvested light beam transmission pulses to the area of interest.

2. The apparatus of claim 1, wherein the scanning fan assembly resides in a LIDAR unit and the at least one additional reflector further comprises at least one additional external reflector physically coupled to the LIDAR unit and external to a housing of the LIDAR unit.

3. The apparatus of claim 2, wherein the LIDAR unit is further configured to convert angular range data to linear range data based on the shape of the reflector.

4. The apparatus of claim 2, wherein the at least one additional external reflector comprises a parabolic reflector.

5. The apparatus of claim 4, wherein the parabolic reflector is one of a two-dimension and three dimension reflector.

6. The apparatus of claim 4, wherein the LIDAR unit is positioned at a focus of the parabolic reflector and oriented such that a scanning fan of light beam transmission pulses from the scanning fan assembly of the LIDAR unit emanates into the reflector and the centerline of the angular range is coincident with the parabola axis of the reflector.

7. The apparatus of claim 6, wherein the parabolic reflector collimates the scanning fan of light beam transmission pulses with the centerlines of the light beam transmission pulses within the scanning fan of light beam transmission pulses emerging from the parabolic reflector parallel to one another and collimates the individual light beam transmission pulses within the scanning fan of light beam transmission pulses.

8. The apparatus of claim 7, wherein the individual light beam transmission pulses within the scanning fan of light beam transmission pulses are emitted from the parabolic reflector in a gap free manner.

9. The apparatus of claim 6, wherein the LIDAR unit and the parabolic reflector are rigidly connected and configured to be rotated through an angular dimension orthogonal to that of the scanning fan of light beam transmission pulses plane to allow the acquisition of three dimensional range data.

10. The apparatus of claim 1, wherein the at least one fixed internal mirror ensures that all light beam transmission pulses emitted from the rotating mirror emerge from the housing and no beams are wasted due to incidence upon a non-reflective interior of the housing.

11. The apparatus of claim 1, wherein some of the light beam transmission pulses emerge from the housing without incidence upon one of the fixed internal mirrors and other light beam transmission pulses will emerge from the housing only after reflecting from one or both of the fixed mirrors, wherein the light beam transmission pulses that emerge from the housing without incidence are associated with the rotating mirror as a physical rangefinder and the light beam transmission pulses that reflect from one of the fixed mirrors are associated with a virtual rangefinder, such that the location of the virtual rangefinder is symmetric to the position of the physical rangefinder about the plane of the reflecting fixed mirror and along the line normal to the fixed mirror and passing through the physical rangefinder.

12. The apparatus of claim 11, wherein a light beam transmission pulses reflecting from a first fixed internal mirror of the two fixed internal mirrors reflects from a second fixed mirror of the two fixed internal mirrors is associated with a second-order virtual rangefinder located at a position symmetric to the first-order virtual rangefinder about the second fixed internal mirror.

13. A light detection and ranging (LIDAR) apparatus comprising:
  means for providing light beam transmission pulses;
  means for directing light beam transmission pulses at each of a given emittance angle over a given angular range;
  means for detecting light beam return pulses associated with a respective transmission light beam transmission pulse;
  means for determining a distance of a detectable object associated with the given emittance angle for each emittance angle over the given angular range; and
  means for reflecting and redirecting the light beam transmission pulses from the means for directing light beam transmission pulses to a given area of interest;
  wherein the means for directing light beam transmission pulses and the means for reflecting and redirecting reside in a housing of the apparatus, the means for reflecting and redirecting being configured to harvest and redirect light beam transmission pulses to the area of interest external to the housing from the means for directing light beam transmission pulses that would otherwise not exit the housing of the LIDAR apparatus;
  wherein individual light beam transmission pulses are emitted from the means for reflecting and redirecting in a gap free manner.

14. The apparatus of claim 13, wherein the means for directing light beam transmission pulses is positioned and oriented with respect to the means for reflecting and redirecting such that a scanning fan of light beam transmission pulses are collimated and the individual light beam transmission pulses within the scanning fan of light beam transmission pulses are collimated.

15. The apparatus of claim 13, wherein the means for reflecting and redirecting ensures that all light beam transmission pulses emitted from the means for directing light beam transmission pulses emerge from the housing and no light beam transmission pulses are wasted due to incidence upon a non-reflective interior of the housing.

* * * * *